(12) United States Patent
Cramer et al.

(10) Patent No.: US 9,186,941 B1
(45) Date of Patent: Nov. 17, 2015

(54) WEIGHT DISTRIBUTION SYSTEM ROUND BAR STORAGE BRACKET SYSTEM

(71) Applicants: Michael Cramer, Rohnert Park, CA (US); Kevin Peebles, Santa Rosa, CA (US)

(72) Inventors: Michael Cramer, Rohnert Park, CA (US); Kevin Peebles, Santa Rosa, CA (US)

(*) Notice: Subject to any disclaimer, the term of this patent is extended or adjusted under 35 U.S.C. 154(b) by 0 days.

(21) Appl. No.: 14/671,340

(22) Filed: Mar. 27, 2015

Related U.S. Application Data

(60) Provisional application No. 61/989,742, filed on May 7, 2014.

(51) Int. Cl.
- *B62D 53/00* (2006.01)
- *B60D 1/24* (2006.01)
- *B60D 1/58* (2006.01)
- *F16M 13/02* (2006.01)

(52) U.S. Cl.
CPC *B60D 1/247* (2013.01); *B60D 1/58* (2013.01); *F16M 13/02* (2013.01)

(58) Field of Classification Search
CPC ........ B60D 1/247; B60D 1/345; B60D 1/065; B60D 1/665

USPC ............ 248/538, 215, 227.1, 340; 280/405.1, 280/455.1, 406.1
See application file for complete search history.

(56) References Cited

U.S. PATENT DOCUMENTS

| | | | |
|---|---|---|---|
| 3,110,507 A * | 11/1963 | Riner | B61D 1/065 180/68.5 |
| 3,965,540 A | 6/1976 | Moore | |
| 4,624,431 A | 11/1986 | Pfeifer | |
| 5,580,076 A * | 12/1996 | DeRoule | B60D 1/247 280/406.2 |
| 5,769,449 A * | 6/1998 | Keesee | G62D 63/067 224/511 |
| 8,262,040 B1 | 9/2012 | Haucke | |
| 8,985,611 B1 * | 3/2015 | Angel | B60D 1/247 270/405.1 |
| 2002/0190498 A1 * | 12/2002 | Schmidt | B60D 1/065 280/455.1 |
| 2006/0244578 A1 * | 11/2006 | Martin | B60D 1/36 340/431 |

* cited by examiner

*Primary Examiner* — Todd M Epps

(57) ABSTRACT

A Storage Bracket System for storing Weight Distribution System Round Bar is provided. The Storage Bracket System comprises two Round Bar Storage Brackets installed in conveniently reachable locations on either side of a trailer frame and angled such that when Weight Distribution System Round Bars are slid into the Round Bar Storage Brackets, they are held in place for storage when not in use.

1 Claim, 5 Drawing Sheets

WEIGHT DISTRIBUTION SYSTEM ROUND BAR STORAGE BRACKET SYSTEM

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

The present invention relates generally to brackets for storing equipment on trailers when not in use. More specifically, the present invention relates to brackets that hold Weight Distribution System Round Bars when not in use.

2. Description of the Related Art

Weight Distribution System Round Bars are frequently used when connecting a trailer to a tow vehicle. With two Weight Distribution System Round Bars installed, the weight of the trailer is more evenly distributed through the tow vehicle and trailer. By evenly distributing the weight, the tow vehicle and trailer maintain a level profile. This ensures the rear chassis of the tow vehicle does not dip downward which could cause damage to the vehicle frame, rear springs and/or shock absorption systems. When disconnecting the trailer from the tow vehicle, however, there is no convenient location for the storage of the Weight Distribution System Round Bars. The present invention provides an easy and convenient storage mechanism and location for the Weight Distribution System Round Bars when not in use.

BRIEF SUMMARY OF THE INVENTION

The present invention is comprised of two Round Bar Storage Brackets with means for attaching each Round Bar Storage Bracket to a Trailer Frame that are installed in a location and orientation that allows for quick, convenient and secure storage of Weight Distribution System Round Bars when they are disconnected from the tow vehicle. Each Round Bar Storage Bracket is a rigid bracket with a cylindrical hole designed for the size and weight of a standard Weight Distribution System Round Bar. One Round Bar Storage Bracket is attached on each side of the trailer frame so it is easily accessible when removing the Weight Distribution System Round Bars. The orientation of each Round Bar Storage Bracket when installed is designed such that the weight of the Weight Distribution System Round Bar holds it in place while not in use.

BRIEF DESCRIPTION OF THE SEVERAL VIEWS OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE INVENTION

In the following detailed description of the invention, reference is made to the accompanying drawings which form a part of the disclosure and which show by way of illustration, and not of limitation, specific embodiments by which the invention may be practiced. The drawings, the foregoing discussion, and the following description are exemplary and explanatory only, and are not intended to limit the scope of the invention or its application in any manner.

The Weight Distribution System Round Bar Storage Bracket System is comprised of two Round Bar Storage Brackets 101 and means for attaching each Round Bar Storage Bracket 101 to a Trailer Frame 107. Each Round Bar Storage Bracket 101 is made preferably from aluminum, but it can be made from any appropriate material that has the strength to hold the weight of a Weight Distribution System Round Bar 102 as installed without damage to the Round Bar Storage Bracket 101. Each Round Bar Storage Bracket 101 consists of a Cylinder 104 and a Mounting Plate 106, which are preferably a single piece of material, but could also be two separate pieces that are joined together.

The Cylinder 104 has an inner diameter 105 that is sized to be slightly larger than the short end of a standard Weight Distribution System Round Bar 102 such that the Weight Distribution System Round Bar 102 can be slid easily in and out of the Round Bar Storage Bracket 101. The Cylinder 104 preferably has a Chamfer 108 at the top end to facilitate installation of the Weight Distribution System Round Bar 102.

The Mounting Plate 106 has two Through Holes 103 located on either side of the Cylinder 104 and approximately in the middle of the height of the Round Bar Storage Bracket 101. The Through Holes 103 are sized to accommodate standard bolts of appropriate strength to ensure the Round Bar Storage Brackets 101 remain firmly attached to the Trailer Frame 107.

The Mounting Plate 106 is preferably the same height as the Cylinder 104 and is wider than the Cylinder 104 such that the Two Through Holes 103 can be easily accessed for bolt installation. The overall height of the Round Bar Storage Bracket 101 is sufficient to support the short end of the Weight Distribution System Round Bar 102.

Figure 1:
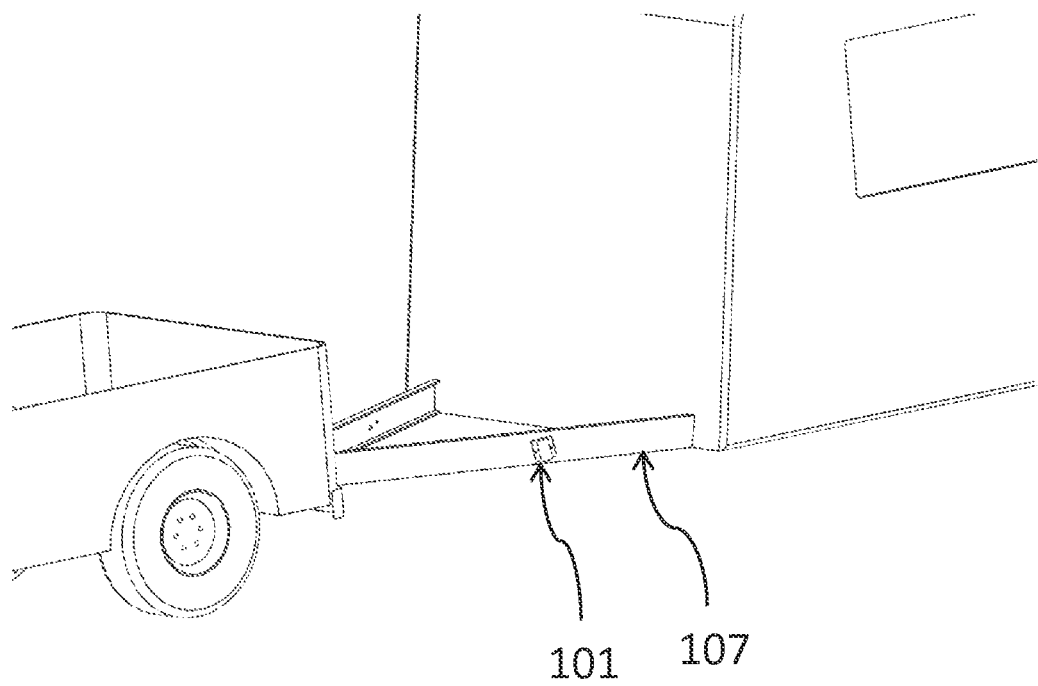
FIG. 1 is a perspective view of the Round Bar Storage Bracket as installed on one side of a Trailer Frame and showing the relative orientation of the Trailer Frame to the towing vehicle and the trailer.
Figure 2:
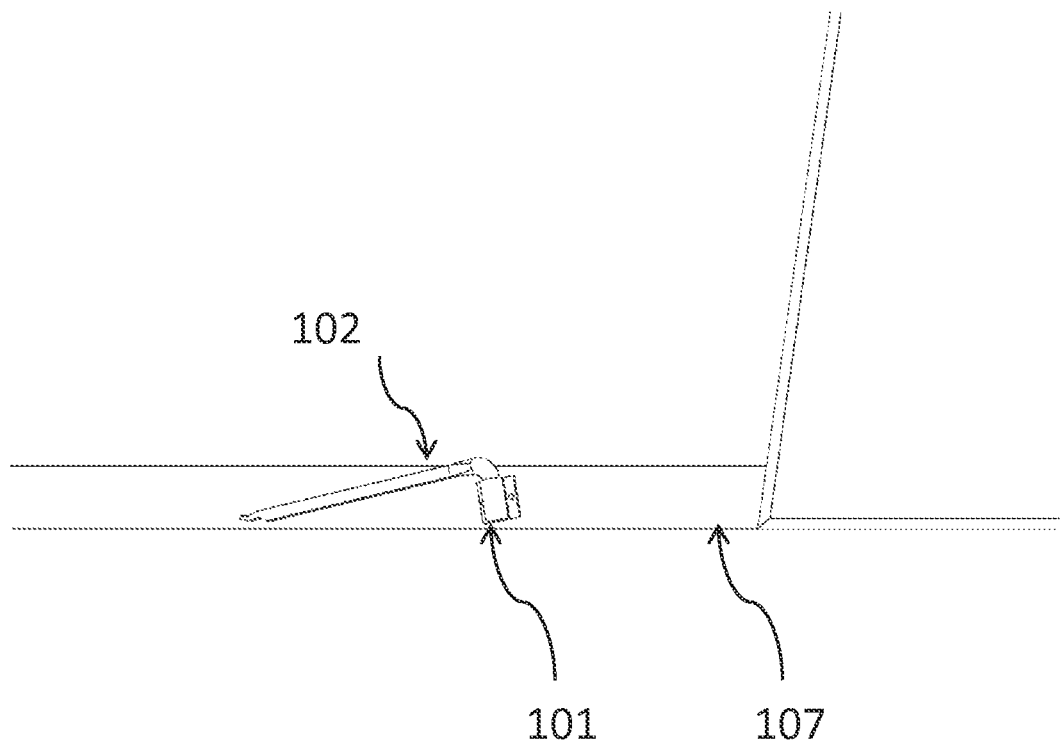
FIG. 2 is a perspective view of one of the Round Bar Storage Brackets as installed and with a Weight Distribution System Round Bar as stowed in the stored condition.
Figure 3:
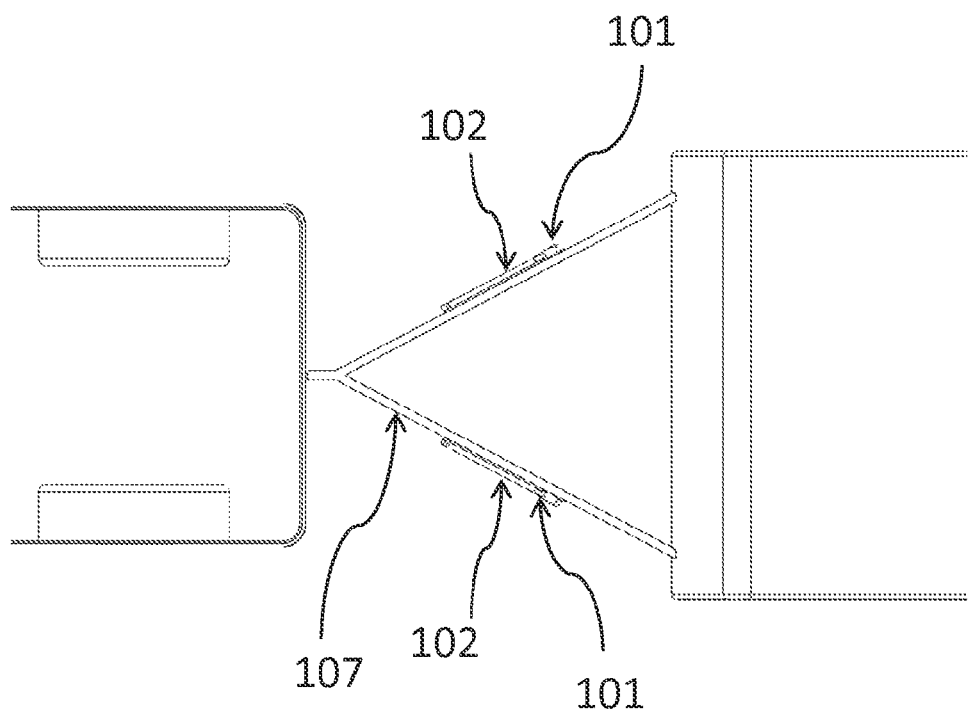
FIG. 3 is a top view of the tow vehicle and trailer showing both Round Bar Storage Brackets installed with both Weight Distribution System Round Bars as stowed in the stored condition.
Figure 4:
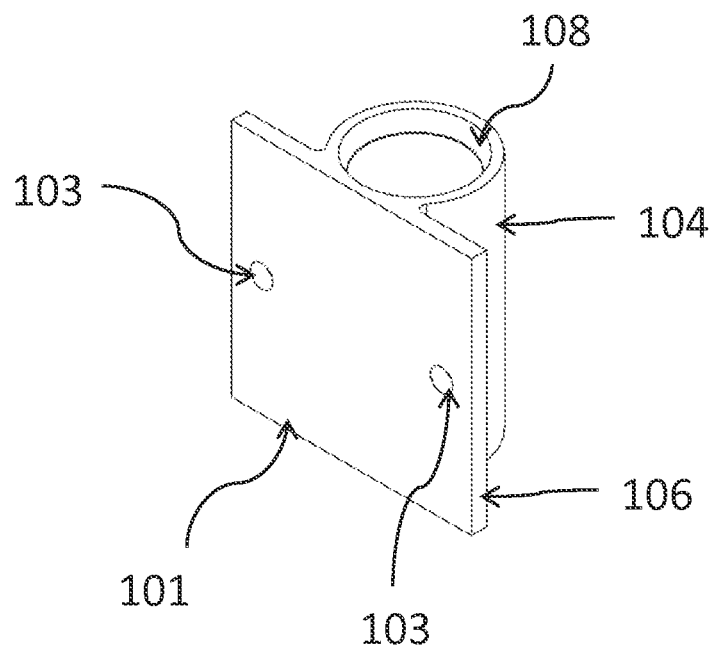
FIG. 4 is a perspective view from the top and back of one of the Round Bar Storage Brackets.
Figure 5:
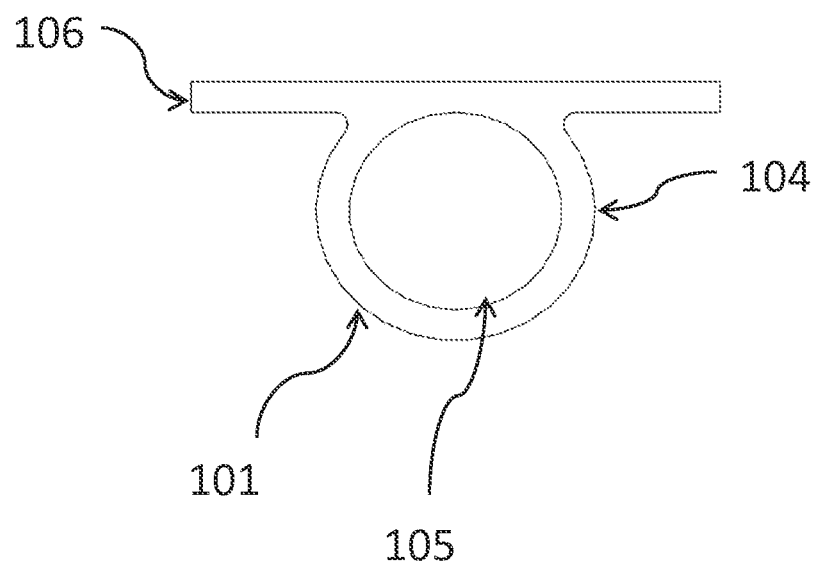
FIG. 5 is a view of the bottom of one of the Round Bar Storage Brackets.

Each Round Bar Storage Bracket 101 is preferably installed with standard bolts, nuts and washers as appropriate into holes that are drilled into the Trailer Frame 107. As illustrated in FIG. 2, the holes are located along the length of the Trailer Frame 107 such that there is sufficient space to accommodate the length of the Weight Distribution Round Bar 102, and are oriented at a slight angle relative to horizontal such that the length of the Weight Distribution Round Bar 102 angles slightly downward. This location for the Round Bar Storage Brackets 101 is very convenient for the user as it allows the user to install the Weight Distribution System Round Bars immediately upon removal. It also ensures the Weight Distribution Round Bars are conveniently accessible for reinstallation when the trailer is reattached to the tow vehicle.

Many modifications and variations of this invention may be made without departing from its spirit and scope, as will be appreciated by those skilled in the art. For example, the Round Bar Storage Brackets 101 could be attached in the desired location by other means, such as by welding, or with attachment devices such clamps. In addition, the Round Bar Storage Brackets could be installed in a location on the vehicle itself if the Weight Distribution System Round Bars were intended to be used with different trailers. In such an embodiment, the additional stress due to motion of the vehicle would be considered for the selection of material, connection means, and final size of the Round Bar Storage Brackets 101. The embodiment as described herein was chosen and described in order to best explain the principles of the invention and its practiced applications.

We claim:

1. A bracket system for storing two weight distribution system round bars, each having a short end and a long end, on a trailer frame having a left side and a right side, the bracket system comprising: a left bracket, a right bracket, a means for attaching said left bracket to said left side of said trailer frame, and a means for attaching said right bracket to said right side of said trailer frame;

wherein said left and right brackets each have a mounting surface suitable for mounting to said left side and said right side of said trailer frame, respectively, and a cylindrical tube having a longitudinal axis that is substantially parallel to said mounting surface, a top end, a bottom end, an inner diameter suitable for receiving said short end of one weight distribution system round bar, and an overall length approximately as long as said short end of one weight distribution system round bar; and wherein said left and right brackets are each mounted using means for attaching said left and right brackets, respectively, to said left side and right side of said trailer frame, respectively, such that said longitudinal axis of said cylindrical tube is angled so that when said short end of one weight distribution system round bar is inserted into said top end of said cylindrical tube, said long end of said weight distribution system round bar hangs downward.

* * * * *